(12) United States Patent
Rastogi et al.

(10) Patent No.: US 7,799,258 B2
(45) Date of Patent: Sep. 21, 2010

(54) PROCESS FOR MANUFACTURING A SHAPED PART OF ULTRA HIGH MOLECULAR WEIGHT POLYETHYLENE

(75) Inventors: Sanjay Rastogi, Eindhoven (NL); Lada Kurelec, Weert (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/493,836

(22) PCT Filed: Oct. 30, 2002

(86) PCT No.: PCT/NL02/00690

§ 371 (c)(1),
(2), (4) Date: Dec. 13, 2004

(87) PCT Pub. No.: WO03/037590

PCT Pub. Date: May 8, 2003

(65) Prior Publication Data

US 2005/0121825 A1    Jun. 9, 2005

(30) Foreign Application Priority Data

Oct. 30, 2001    (EP)    ................................ 01000581

(51) Int. Cl.
B29C 55/00    (2006.01)
B29C 71/00    (2006.01)
C08F 110/02    (2006.01)
A61B 17/04    (2006.01)

(52) U.S. Cl. ............ 264/288.4; 264/210.8; 264/211.22; 264/235; 264/237; 264/290.2; 264/290.5; 264/346; 428/364; 428/394; 526/352; 606/228

(58) Field of Classification Search .......... 264/109–128
See application file for complete search history.

(56) References Cited

U.S. PATENT DOCUMENTS

| | | | |
|---|---|---|---|
| 4,281,070 A * | 7/1981 | Scheetz et al. ............... | 524/528 |
| 4,455,273 A | 6/1984 | Harpell | |
| 4,888,141 A * | 12/1989 | Bastiaansen et al. ........ | 264/480 |
| 5,399,308 A * | 3/1995 | Woodhams et al. ...... | 264/210.2 |
| 5,478,906 A * | 12/1995 | Howard, Jr. ................. | 526/352 |
| 5,505,900 A * | 4/1996 | Suwanda et al. ............ | 264/477 |
| 5,702,657 A * | 12/1997 | Yoshida et al. .............. | 264/112 |
| 5,741,451 A * | 4/1998 | Dunbar et al. .............. | 264/103 |
| 6,017,975 A * | 1/2000 | Saum et al. ................. | 522/161 |
| 6,265,504 B1 * | 7/2001 | Liu et al. .................... | 526/161 |
| 6,277,464 B1 * | 8/2001 | Ronan et al. ................ | 428/131 |
| 6,562,540 B2 * | 5/2003 | Saum et al. ................. | 430/130 |
| 6,818,172 B2 * | 11/2004 | King et al. .................. | 264/479 |

OTHER PUBLICATIONS

Rastogi et al., Chain Mobility in Polymer Systems, Macromolecules, 1998, 31, 5022-5031.*
Ogita et al., "Drawability of Ultrahigh Molecular Weight Polyethylene Single-Crystal Mats", Macromolecules, vol. 26, 1993, pp. 4646-4651.
Xi-You Wang et al., "Melting of UltraHigh Molecular Weight Polyethylene", J. of Applied Polymer Science, vol. 34, 1987, pp. 593-599.
Chemical Abstracts, vol. 129, No. 23, Dec. 7, 1998, Abstract No. 303163, Aulov et al.
Lippits, "Controlling the Melting Kinetics of Polymers; a route to a New Melt State", Library of Eindhoven Suniversity of Technology, ISBN: 978:90:386-0895-2, pp. 47-48 and 78-79 (2007).
Rastogi et al, Nature Mat. 2005, 4, 635.
Lippits et al, Phys. Rev. Lett., 2006, 96, 218303.
U.S. Appl. No. 10/492,416, filed Apr. 2, 2004, entitled "Process to Sinter Ultra High Molecular Weight Polyetheylene."
Clarke et al, *Photochemical Reactions of Organometallic Complexes Impregnated into Polymers: Speciation, Isomerization, and Hydrogenation of Residual Alkene Moieties in Polyethylene*, J. Am. Chem. Soc. 2000, 122, 2523-2531.
Rotzinger et al, *High strength/high modulus polyethylene: synthesis and processing of ultra-high molecular weight virgin powders*, Polymer, vol. 30, pp. 1814-1819, Oct. 1989.

* cited by examiner

*Primary Examiner*—Jeffrey Wollschlager
(74) *Attorney, Agent, or Firm*—Nixon & Vanderhye P.C.

(57) ABSTRACT

The invention relates to a process for the manufacture of a shaped part of ultra high molecular weight polyethylene (UHMW-PE) comprising melt processing, wherein UHMW-PE a) is annealed at a temperature between 130° C. and 136° C., preferably at about 135° C. for at least one hour, b) is converted into a shaped part at a temperature above 142° C.; and c) is cooled down to a temperature below 135° C. The invention further relates to a part like a fiber made with the process and the use of the fiber in a bio medical application.

13 Claims, 6 Drawing Sheets

US 7,799,258 B2

PROCESS FOR MANUFACTURING A SHAPED PART OF ULTRA HIGH MOLECULAR WEIGHT POLYETHYLENE

CROSS REFERENCE TO RELATED APPLICATION

This application is the National Phase of International Application PCT/NL02/00690, filed Oct. 30, 2002, which designated the U.S., and was published in English.

FIELD

The invention relates to a process for the manufacture of a shaped part of ultra high molecular weight polyethylene (UHMW-PE) comprising melt processing. The invention further relates to a shaped part obtainable with this process, and to the use thereof in biomedical applications.

BACKGROUND AND SUMMARY

The processability of a synthetic polymer is often a compromise between the ease of processing and desired product properties. Processing routes conventionally applied in the polymer industry are injection moulding, extrusion and blow moulding. All these routes start from a melt of the polymer. Melt properties are mostly affected by the molecular mass of the polymer.

For a melt consisting of relatively low molecular mass polymers ($M_w < M_c$) there is a direct proportionality between zero-shear viscosity ($\eta_0$) and molecular mass, whereas for a melt consisting of high molecular mass polymers ($M_w > M_c$) the viscosity depends much more strongly on the molecular mass ($\eta_0 \sim (M_w)^{3.4}$). Herein is $M_w$ the weight averaged molecular mass and $M_c$ the critical molecular mass, which is related to the shortest polymer chain length able to form an entanglement. This difference in viscosity of the two molecular mass regimes is due to the ability of long chains to entangle, which imposes a restriction on the flowability of a melt.

The motion of chains within a highly entangled melt is described by the reptation model introduced by De Gennes in J. Chem. Phys. 55, p. 572 (1971). In this model a chain within a melt moves in worm-like fashion through a virtual tube, which is delineated by entanglements formed by neighbouring chains. The time needed for a chain to renew its tube (reptation time), i.e. to change its position within the melt is also highly dependent on molecular mass ($\tau_0 \sim M_w^3$). These fundamental restrictions make high molecular mass polymers rather intractable via conventional processing routes. On the other hand, final properties like tenacity, strength and wear improve with increasing molecular mass. Superior properties are necessary to meet the requirements of demanding applications.

The discrepancy between intrinsic properties related to high values of molecular mass and insufficient product performance due to difficulties in processing is encountered in UHMW-PE as well as in other polymers of very high molecular mass. UHMW-PE is a linear grade polyethylene, as is high-density polyethylene (HDPE), but possesses a weight average molecular mass of at least $7,\cdot 5*10^5$ g/mol (according to ASTM D4020). Preferably the UHMW-PE has a weight average molecular mass of at least $3*\cdot 10^6$ g/mol, because of excellent mechanical properties.

A major breakthrough in the processing of UHMW-PE was achieved in the early 1980s when solution spinning of UHMW-PE into high modulus/high strength fibres was introduced. In the process described in UK Patent 2,051,661 UHMW-PE is dissolved in a solvent at elevated temperature and the semi-dilute solution is spun into filaments, e.g. gel filaments, which filaments are subsequently before, after and/or during removal of solvent drawn to high drawing ratios (above 30), at temperatures close to but below the dissolution or the melting point. Thus obtained fibres possess a tensile strength of about 3 GPa and a tensile or Young's modulus of above 100 GPa.

A disadvantage of the thus obtained fibre is that this fibre always contains a certain residual amount of solvent. In general the amount of solvent present in solution- or gel-spun fibres is at least 100 ppm. An identical polymer sample made by processing, and thus crystallisation from the melt could not be drawn more than 5-7 times, resulting in the fibre possessing poor mechanical properties.

These results suggested that the density of the entanglements plays a prominent role in the process of drawing and obtaining fully aligned chains in the direction of drawing. The effect of entanglement density was confirmed by drawing experiments on single-crystal mats from UHMW-PE, as reported by T. Ogita et al. in Macromolecules 26, p. 4646 (1993). In the case of melt crystallised UHMW-PE, entanglements are trapped upon crystallisation and limit the extent to which the chains can be drawn. On the other hand, crystallisation of long molecular chains from the semi-dilute solutions leads to a much less entangled system and this enables these materials to be drawn below the melting temperature. It has always been believed that once a disentangled state of UHMW-PE has been achieved, the formation of entanglements within the melt will be very slow, due to a long reptation time, and consequently one would be able to benefit from a disentangled state during processing. Experimental results however showed that highly disentangled solution crystallised films of UHMW-PE, which are drawable below the melting temperature lose their drawability immediately upon melting. This phenomenon has been associated with that of "chain explosion", as experimentally assessed by P. Barham and D. Sadler in Polymer 32, p. 939 (1991). With the help of in-situ neutron scattering experiments they observed that the chains of highly disentangled folded chain crystals of polyethylene increase the radius of gyration instantaneously upon melting. Consequently the chains entangle immediately upon melting, which causes the sudden loss in processability and drawability once the sample has been molten.

These results showed that the fundamental restrictions resulting from the strong dependence of the zero-shear viscosity on molecular mass cannot be easily overcome. Simple disentanglement of the chains prior to melting will not lead to a less entangled melt and accordingly it cannot be used to improve the melt processability of UHMW-PE.

The objective of the present invention is to provide a process for the manufacture of a shaped part of ultra high molecular weight polyethylene (UHMW-PE) comprising melt processing, which part shows good drawability below its melting point.

According to the invention this objective is achieved with a process characterized in that UHMW-PE a. Is annealed at a temperature between 130° C. and 136° C., preferably at about 135° C., for at least 1 hour;
b. is subsequently converted into a shaped part at a temperature above 142° C.; and
c. is then cooled down to a temperature below 135° C.

With the process according to the invention a shaped part of ultra high molecular weight polyethylene can be made by melt processing. The part thus formed is still highly drawable below its melting point, which indicates that, even though the UHMW-PE is processed in the melt, it still has a low entanglement density. A further advantage of this process is that a shaped part of UHMW-PE is made that contains no or very low amounts of residual solvent.

DETAILED DESCRIPTION

Figure 1:
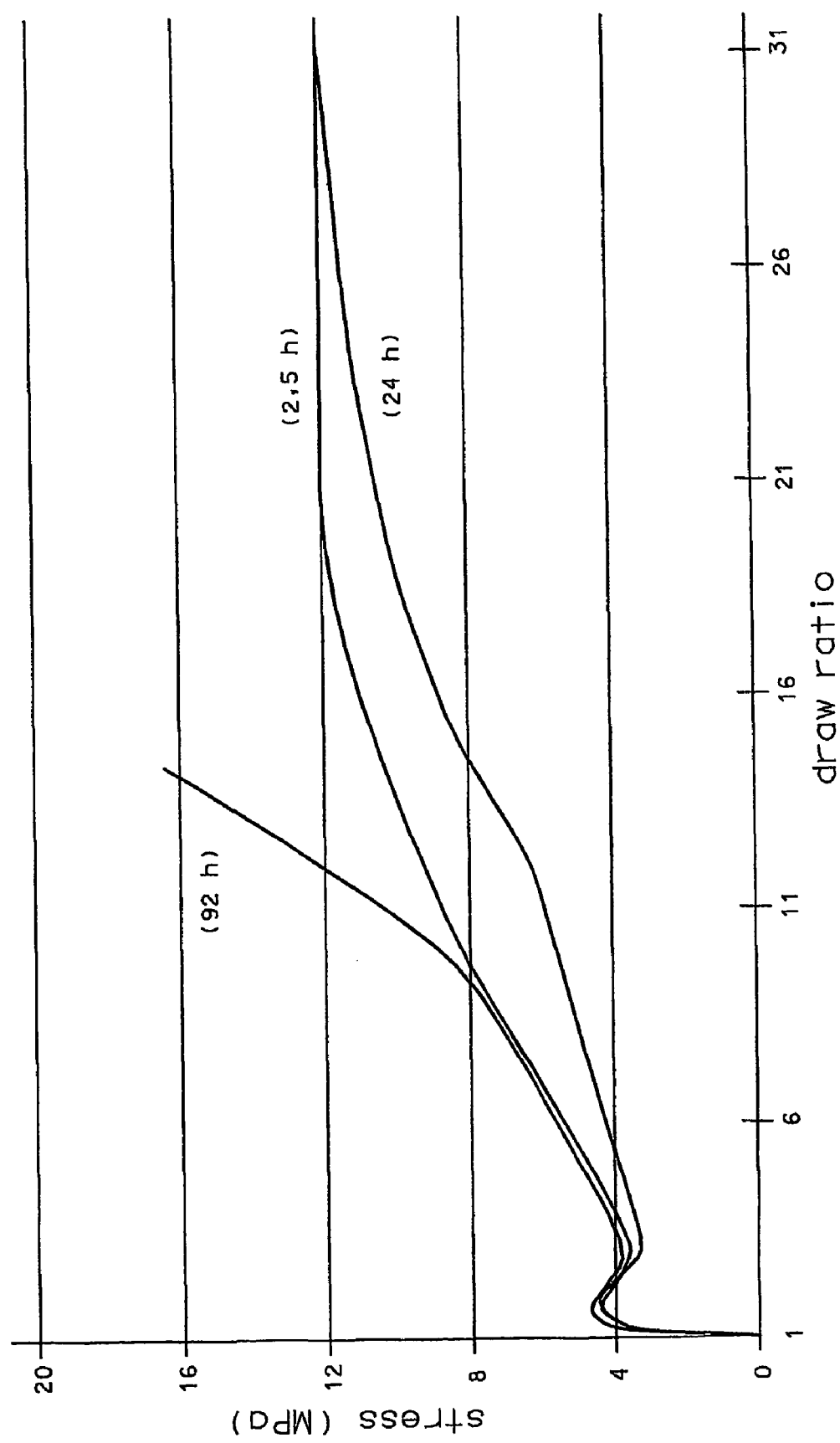
FIG. 1 is a graph of tensile tests at room temperature on a metallocene grade UHMW-PE with a molecular mass of $3.6*10^6$ g/mol (sample M1) annealed at 136° C. for 2.5, 24 and 92 hours.

The annealing step in the process according to the invention can be accomplished in several manners. One method is to first compress a UHMW-PE powder into for example a film at a pressure of about 20 MPa and a temperature of 50° C. The film can then be annealed at a temperature between 130 and 136° C., e.g. in an oil bath with the film wrapped in an aluminum foil. Below 130° C. annealing times are extremely long; a higher annealing temperature generally results in shorter annealing times, making the process more economic. Too high an annealing temperature, however, does not result in the product obtained showing improved drawability. Without wishing to be bound to any theory, the inventors assume this to be related the "chain explosion" effect as a result of increased chain mobility. The annealing temperature is therefore preferably about 135° C. About 135° C. in practice means 135±1° C.

UHMW-PE is normally obtained in the form of fine powder usually synthesised with the aid of for example a Ziegler-Natta catalyst system at temperatures below the crystallisation temperature of the polymer chain. These synthesis conditions force the molecular chains to crystallise immediately upon their formation, which leads to a rather unique morphology, which differs substantially from that of material obtained from the melt. The crystalline morphology created at the surface of a catalyst will highly depend on the ratio between the crystallisation rate and the growth rate of the polymer. Moreover, the synthesis temperature, which in this particular case is equal to the crystallisation temperature, will heavily affect the morphology of the obtained UHMW-PE powder. Such as-polymerised powder is also referred to as virgin or nascent powder. One of the most prominent features of nascent UHMW-PE powders is their ability to flow below the α relaxation temperature, as described by P. Smith et al. in J. Mater. Sci., 22, p. 523 (1987). This extraordinary property of nascent powders is associated with a reduced number of entanglements. The extent to which the number of entanglements is reduced for nascent powders is highly dependent on synthesis conditions (synthesis temperature and monomer pressure) as well as the type of catalyst used. If during polymerisation only one or very few chains grow from the catalytic site, a low entanglement density will result. UHMW-PE of very low entanglement density is for example obtained if a single-site catalyst is used, like for example a metallocene catalyst. Such nascent UHMW-PE powder of low entanglement density is also called disentangled powder.

Another way to obtain a disentangled powder is via the mobile hexagonal phase as described by S. Rastogi et. al. in Macromolecules 31, p. 5022 (1998).

A method suitable for qualitatively assessing the extent of initial (dis)entanglement of a nascent powder material is simple compaction of the powder at 50° C. and subsequent observation of the transparency of the obtained film. A powder resulting in a transparent film upon being compacted at 50° C. is hereinafter referred to as a disentangled UHMW-PE or a disentangled powder.

The UHMW-PE employed in the process of the invention may be melt crystallized or a nascent powder. It has been found that melt processability after annealing UHMW-PE is obtained much faster, that is after shorter annealing times, for a disentangled UHMW-PE than for a melt crystallized UHMW-PE. Therefore, the process of the invention is preferably carried out using a disentangled UHMW-PE. Although an annealing time of about one hour is sufficient when UHMW-PE with weight average molecular weight of $8.10^5$ g/mol is applied, the process of the invention is preferably carried out using a disentangled UHMW-PE with a weight average molecular mass of more than $3.10^6$ g/mol. The advantage of using a UHMW-PE with a weight average molecular mass of more than $3.10^6$ g/mol in the process of the invention is that the mechanical properties of parts made are superior to those of parts made from a UHMW-PE of lower $M_w$. Another advantage of a higher molecular mass is that more time is available to process the melt. This is due to the fact that the entanglement density in the melt slowly increases as a function of time, which process is slower for higher molecular mass molecules.

In general, the higher the molar mass of the UHMW-PE, the longer the annealing time. Preferably, disentangled UHMW-PE is annealed for at least 15 hours. When a UHMW-PE with a weight average molecular mass of about $3.10^6$ g/mol is annealed for 15 hours, at least 90% by weight of the disentangled UHMW-PE is transformed into UHMW-PE which shows a melting peak in a DSC scan at about 135° C. (see later).

Figure 3:
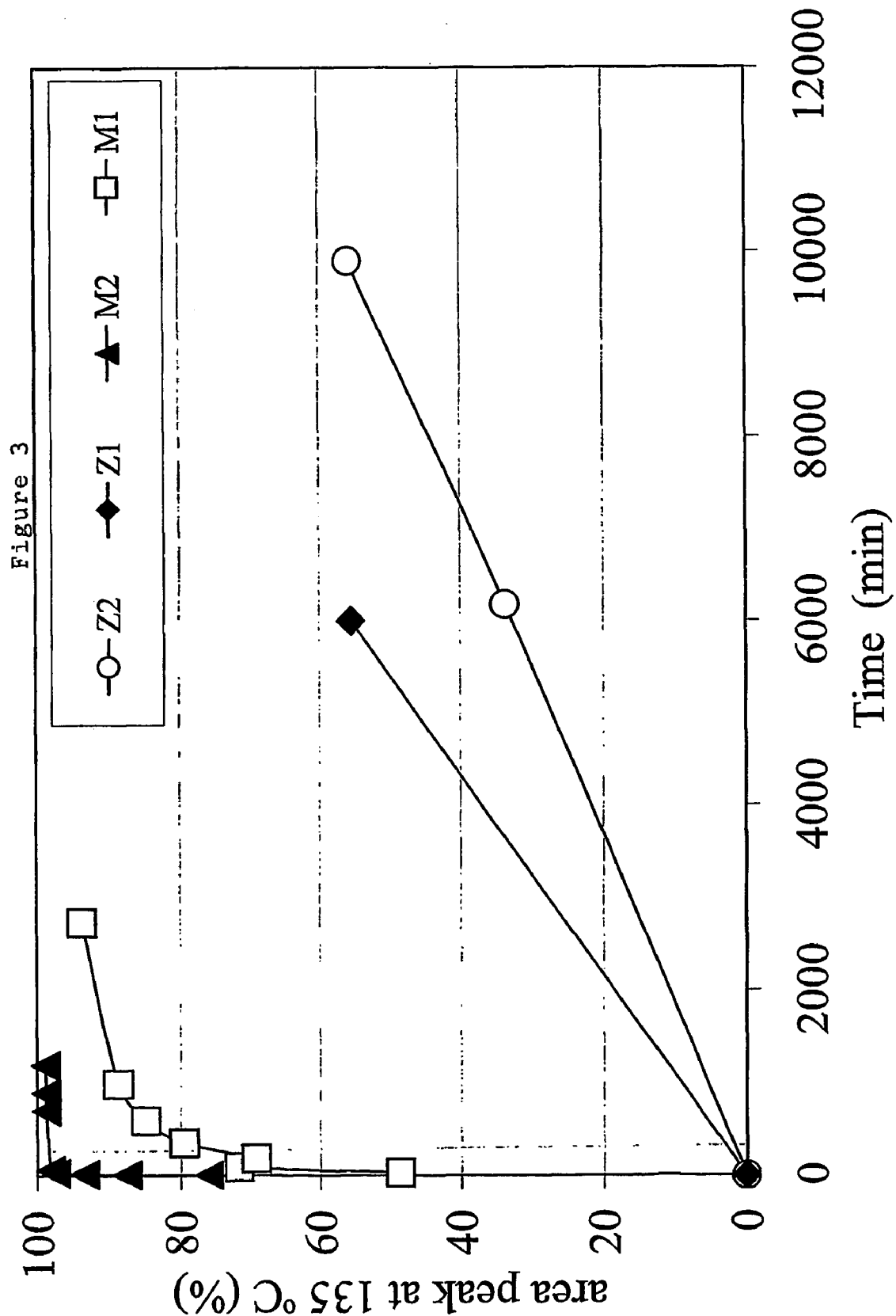
FIG. 3 is a graph quantifying the change in DSC-curves as the percentage of the total area of the melting peak at 135° C. a for different grades of UHMW-PE and annealing times.

The annealing time strongly depends on the grade of UHMW-PE as can be seen from FIG. 3 (see Example I). Although FIG. 3 suggests that there is no maximum for the annealing time, after a too long annealing time strain hardening occurs.

A metallocene grade UHMW-PE with a molecular mass of $3,6*10^6$ g/mol (sample M1) was annealed for different periods and results of the tensile tests performed on these samples at room temperature are depicted in FIG. 1 (for samples with annealing time at 136° C. of 2.5, 24 and 92 hours). The samples that were annealed at 136° C. for 2.5 hours, 6 hours, and 24 hours could be extended to draw ratios over 30. However, the sample that was annealed for 92 hours could not be drawn to the same extent and shows more strain hardening. With these tensile tests the optimum annealing time can easily be determined for one skilled in the art for a certain grade of UHMW-PE.

Although the processing temperature in step b) of the process according to the invention is not critical, higher processing temperatures shorten the time available for processing due to faster entangling at higher temperatures. Therefore, in the process of the invention, the temperature preferably does not exceed 170° C.

In the process of the invention, molten polymer may be converted into a shaped part of UHMW-PE in various manners known in the art of melt processing. The conversion of the melt into a filament can be effected by spinning the melt through a spinneret. Stretching or drawing of the filament (uni-axially) results in lengthwise orientation of the UHMW-PE molecules, which increases the strength of the filaments. Filament strength can be increased further by subsequent stretching at temperatures between the melting point of the filament and a temperature not more than 10° C. below the melting temperature of the filament. Under the melting point of the filament here and hereafter is understood the actual melting point of the filament in a situation, wherein the filament is kept under tension. Preferably, the filament is stretched at least 30× (draw ratio 30). In general, the melt will be spun through a large number of spinnerets arranged in parallel, thus forming a multi-filament fibre or yarn. Within the context of the present application, the term fibre is used to indicate both mono- and multi-filament parts.

Conversion into a film can be effected in various ways, for instance by spinning using a spinneret with a very wide, slit-shaped die, by extruding, or by casting onto a roll or belt. During and/or after processing of a UHMW-PE melt into a film, the temperature is reduced to such an extent that crystallization occurs in the film, resulting in a structure that is sufficiently strong and stable for further processing. During cooling the part tends to shrink. According to the present invention such shrinkage can be prevented in at least one direction in the plane of the film. To this end the film may be clamped in a simple manner. When the film is clamped in two directions, its thickness is the only dimension that can and that actually does decrease. The same applies more or less to, for instance, tubular films and hollow filaments.

In the process of the invention it is not only possible to prevent shrinkage, but even to stretch in one or two directions, uni- or bi-axially stretching, respectively. Such stretching in each direction preferably does not exceed 8×, the increase in surface area being at most 25× and preferably at most 20×.

The invention further relates to an UHMW-PE part obtainable by the process according to the invention. An advantage of the shaped part, especially the fibre obtainable with the process of the invention is that the fibre contains less than 50 ppm, preferably less than 20 ppm, of a solvent. Such fibers are not obtainable by a solution or a gel spinning process. A gel-spun fiber generally contains more than 100 ppm of a solvent. Under "solvent" here and hereafter is understood either a solvent for UHMW-PE (like decaline or paraffine) and/or a solvent used in a solution or gel spinning process to extract a solvent for UHMW-PE out of the fibre. In view of this low solvent content, such parts are very suited for use in various bio-medical applications, including implants, like artificial prosthesis such as hip or knee joints; sutures; and the like.

The invention therefore further relates to the use of the part, e.g. fibre obtainable by the process of the invention in a biomedical application.

The invention is further elucidated with reference to the following examples.

EXAMPLE I

Figure 2:
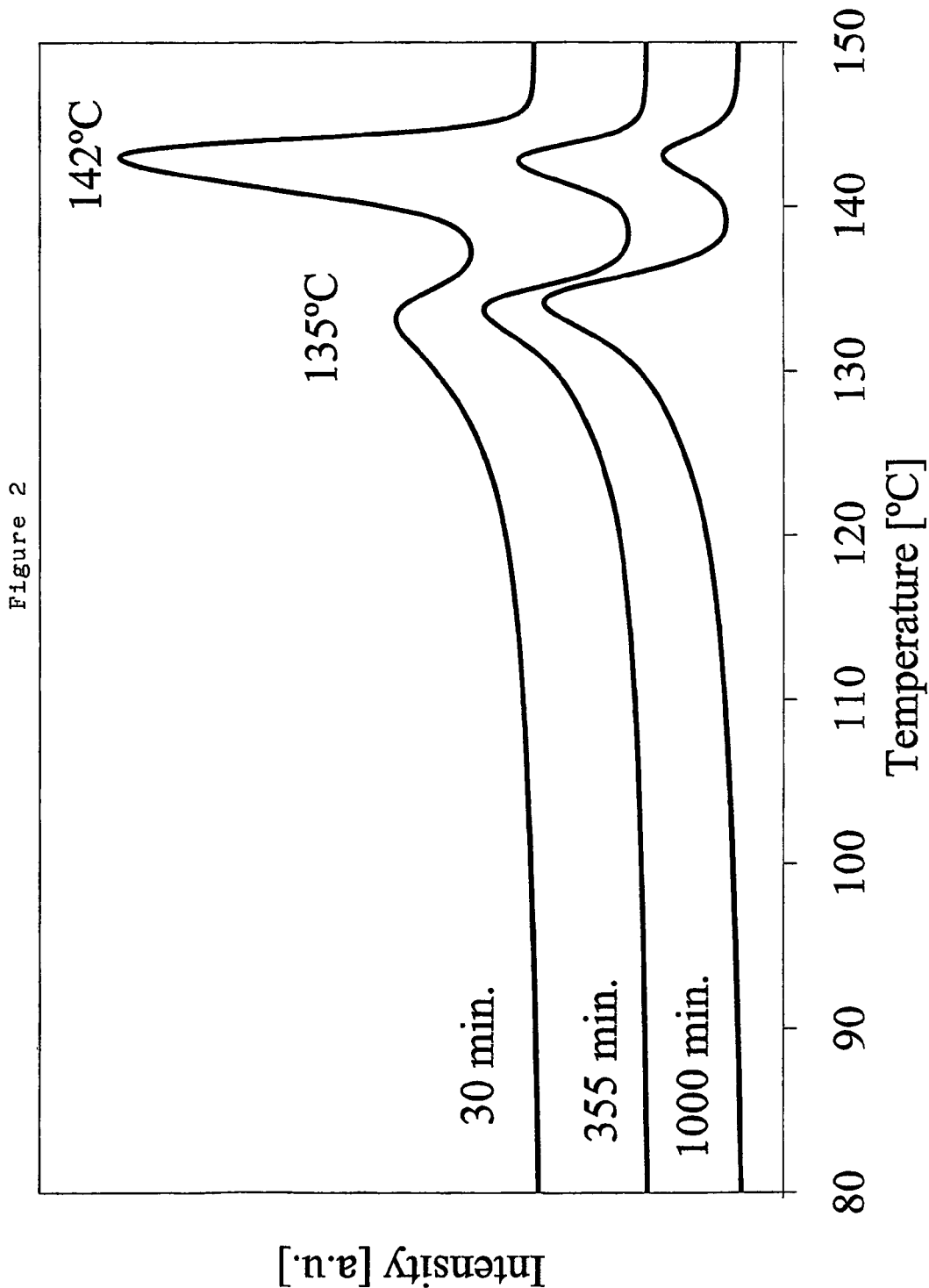
FIG. 2 depicts DSC curves for samples annealed at different times showing that two melting peaks are observed.

To confirm that a new material with different properties is formed during annealing of UHMW-PE, annealing experiments were performed just below the melting point of a nascent UHMW-PE with $M_w$ of $3.6*10^6$ g/mol (M1). The annealing experiments were performed in an oil bath at 136° C. for different periods. In FIG. 2 the DSC-curves are depicted for samples that were annealed at different times. Instead of one, two melting peaks were observed. The peak at 135° C. is associated to the crystallised material after annealing and the peak at 142° C. to the nascent material. The fact that we found two peaks indicates that there are two populations, one that was molten during annealing at 136° C. resulting in a peak at 135° C. and another that was not molten at all, giving a melting peak at 142° C.

In FIG. 2 a clear change in the shape of the DSC-curve for the different annealing times is observed. In the DSC curves we can associate the peak area (corrected for mass) with the enthalpy change during melting of a certain population. This change in the DSC-curve needs to be quantified. To do so for every curve the total peak area was calculated, and after that the fraction of the area of the peak at 135° C., related to the total area was determined. In other words, the differences were quantified by determining $\Delta H_{(135° C.)}/(\Delta H_{(135° C.)} + \Delta H_{(142° C.)})$ for different grades and annealing times. The results for four different kinds of grades are depicted in FIG. 3, showing the influence of annealing time on melting during annealing at 136° C. of four different grades of UHMW-PE: for metallocene-based grades ($M_w$=800,000 g/mol resp. $M_w$=$3.6*10^6$ g/mol; indicated as M2 and M1) and for Ziegler-Natta-based grades (a lab. scale grade with an initially low entanglement density designated as Z1, and a commercial grade with an initially high entanglement density, Z2).

In FIG. 3 the fraction of the melting peak at 135° C. is given as a percentage of the total area.

If the two Ziegler-Natta grades are compared some differences can be distinguished, for the commercial grade (Z2) more than 6 days of annealing were needed to melt approximately 50% of the nascent crystals, compared to three days for the lab scale Ziegler-Natta grade (Z1). If we look at the metallocene grades we see that after annealing approximately one hour the metallocene grade with a molecular weight of 800,000 g/mol (M2) was molten almost completely. However, the grade with an $M_w$ of $3.6*10^6$ g/mol needed annealing times of approximately one day to melt 95% of the original crystals.

In order to elucidate the influence of annealing on the melt-processablity of UHMW-PE and on properties of the part obtained, UHMW-PE ($M_w$=$3.6*10^6$ g/mol) annealed at 136° C. is compared in a tensile test carried out at 120° C. with the same UHMW-PE only crystallized from a melt at 160° C.

Figure 4:
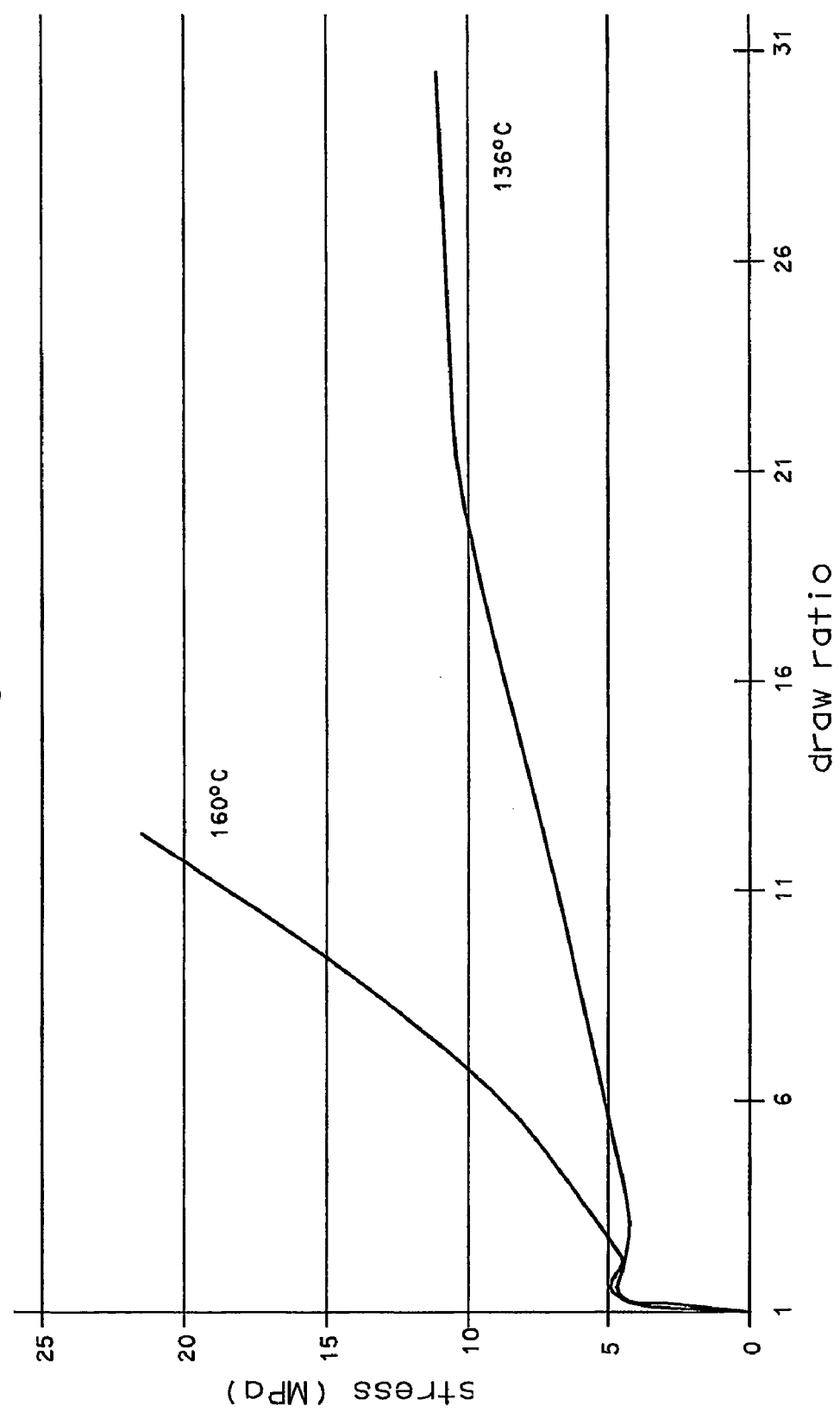
FIG. 4 is a graph of tensile tests comparing a UHMW-PE material annealed at 136° C. to the same UMW-PE material crystallized from a melt at 160° C.

The results of the tensile test are given in FIG. 4. The annealed material (136° C.) could be drawn to a much larger extent than the melt-crystallized material (160° C.). The end of the curve representing the annealed material was not due to breaking of the material but due to the limits of the tensile tester, so the maximum draw ratio is even larger.

The loss in drawability of the 160° C. melt-crystallised samples suggests that upon heating to 160° C. the favourable disentangled morphology is lost. However the sample that was first annealed at 136° C. according to the process of the invention could be drawn to very high draw ratios, suggesting that the favourable disentangled state is preserved. These results support the invention: After annealing for 24 hours at 136° C. the melt and the part obtained after cooling possesses fewer entanglements than the melt and part obtained via conventional melting.

This conclusion is confirmed by performing tensile tests on recrystallised material.

EXAMPLE II

Figure 5:
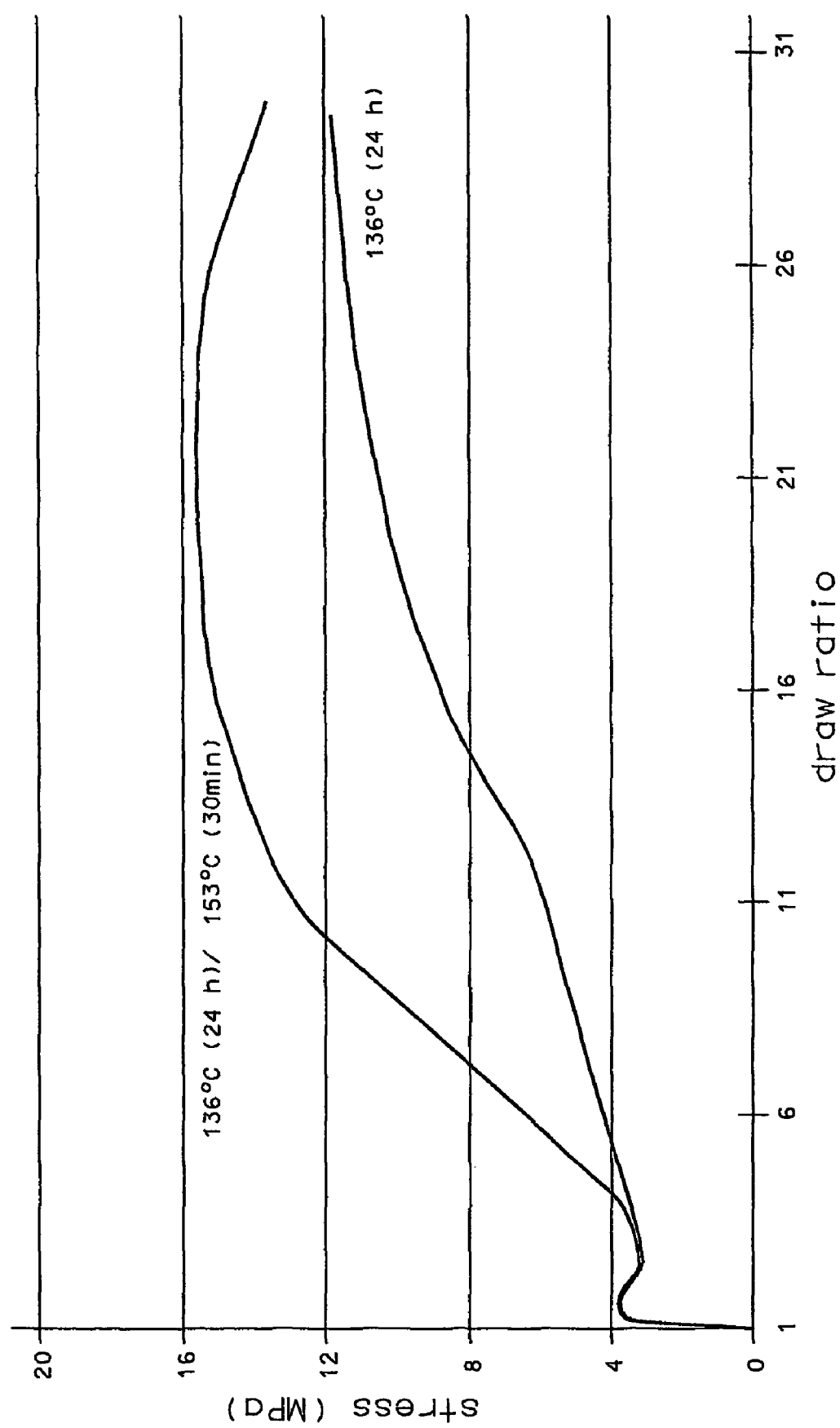
FIG. 5 is a graph of tensile tests comparing UHMW-PE samples annealed only at 136° C. and samples annealed at 136° C. and subsequently heated to 153° C. in 30 minutes.

Metallocene based UHMW-PE with a molecular mass of $3.6 \cdot 10^6$ g/mol was annealed at 136° C. for 24 hours and subsequently heated to 153 or 160° C. and thereafter cooled to room temperature. The results of tensile tests performed on samples annealed only at 136° C. and annealed at 136° C. and subsequently heated to 153° C. in 30 minutes are depicted in FIG. 5. Also other samples further heated after annealing showed similar curves.

If the results in FIG. 5 are compared with the results of the solution cast material in Comparative Experiment A, it becomes clear that the annealed metallocene UHMW-PE retains it drawabilty even after crystallisation from the melt, i.e. at 153 or 160° C., whereas in the solution-cast material the drawability was lost upon crystallisation from the melt. The stress-strain curves in FIG. 5 have somewhat different shapes; around a draw ratio of 6 where the stress in the material recrystallised from the melt at 153° C. increases faster than that of the recrystallised material obtained directly after annealing. Normally this increase in stress is related to an increase in entanglement density. The results indicate that upon heating above the equilibrium melting point (142° C. for oriented UHMW-PE) there is some increase in entanglement density, however, upon extension this slight increase does not have a deteriorating effect on the drawabilty.

COMPARATIVE EXPERIMENT A

Figure 6:
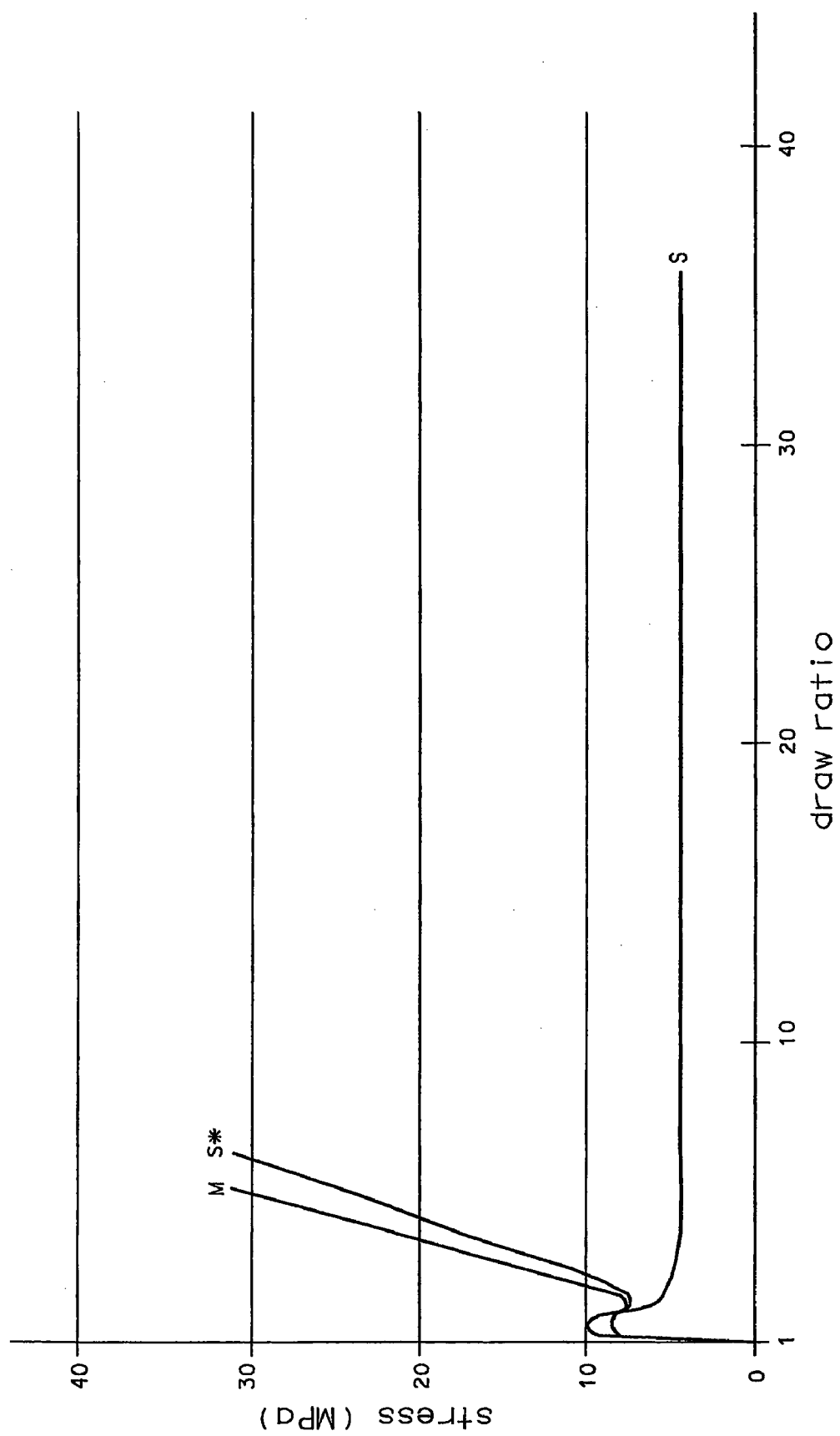
FIG. 6 is a graph showing drawing characteristics of molten and recrystallised solution cast UHMW-PE, where S represents the solution cast material, S* represents the recrystallised material and M represents ordinary melt-crystallised material.

Upon heating of a solution-cast material, which has a low entanglement density and is in that aspect quite similar to a disentangled UHMW-PE grade, to temperatures above the melting point the favourable drawing behaviour was lost almost immediately. At first sight this phenomenon is hard to explain because it was anticipated that the long reptation times would prohibit the formation of entanglements in such short time intervals, and so preserve the excellent drawing characteristics. In FIG. 6, depicting the drawing characteristics of molten and recrystallised solution cast UHMW-PE, S represents the solution cast material, S* the recrystallised material and M stands for ordinary melt-crystallised. It can be concluded that upon mere melting/recrystallisation, that is without a prior annealing step, solution-cast material immediately looses its excellent drawing behaviour.

The invention claimed is:

1. Process for the manufacture of a shaped part of ultra high molecular weight polyethylene (UHMW-PE) which comprises the steps of:
    a) annealing a nascent disentangled UHMW-PE powder having a weight average molecular mass of at least $3.6 \times 10^6$ g/mol as measured according to ASTM D4020 at a temperature between 130° C. and 136° C. for at least one hour;
    b) subsequently converting the annealed powder into a shaped part by melt processing, including drawing the shaped part, at a temperature above 142° C.; and then
    c) cooling the shaped part to a temperature below 135° C.

2. Process according to claim 1, wherein the temperature in step a) is about 135° C.

3. Process according to claim 1, wherein the UHMW-PE is annealed for at least 15 hours.

4. Process according to claim 1, wherein the temperature in step b) does not exceed 170° C.

5. Process according to claim 1, wherein step b) comprises converting the annealed powder into a filament by spinning a melt thereof through a spinneret.

6. Process according to claim 1, further comprising uni-axially or bi-axially stretching the shaped part at a temperature between the melting point of the shaped part and a temperature not more than 10° C. below the melting point.

7. Process according to claim 1, wherein step b) includes converting a melt of the annealed powder by melt processing into a film by spinning the melt through a spinneret with a wide slit-shaped die, extruding the melt, or casting the melt onto a roll or belt.

8. Melt spun ultra high molecular weight polyethylene (UHMW-PE) fibre made by the process of claim 1, wherein the UHMW-PE presents two melting peaks in a differential scanning calorimetry (DSC) curve after annealing at a temperature between 130° C. and 136° C. for at least one hour, and wherein the UHMW-PE fibre contains less than 50 ppm of a solvent for UHMW-PE and/or a solvent used to extract a solvent for UHMW-PE out of the fibre.

9. UHMW-PE fibre according to claim 8, wherein the fibre contains less than 20 ppm of decaline or paraffine.

10. A part for biomedical applications, comprising the UHMW-PE fibre of claim 8.

11. An implant comprising the part of claim 10.

12. An artificial prosthesis comprising the part of claim 10.

13. A suture comprising the part of claim 10.

* * * * *